US009868613B2

United States Patent
Momoki (10) Patent No.: US 9,868,613 B2
(45) Date of Patent: Jan. 16, 2018

(54) BRAKING APPARATUS, ELEVATOR HOISTING MACHINE THAT USES SAME, AND BUFFERING REACTION FORCE ADJUSTING METHOD FOR A BRAKING APPARATUS

(71) Applicant: MITSUBISHI ELECTRIC CORPORATION, Chiyoda-ku (JP)

(72) Inventor: Shimpei Momoki, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 74 days.

(21) Appl. No.: 14/781,814

(22) PCT Filed: Apr. 24, 2013

(86) PCT No.: PCT/JP2013/062032
§ 371 (c)(1),
(2) Date: Oct. 1, 2015

(87) PCT Pub. No.: WO2014/174603
PCT Pub. Date: Oct. 30, 2014

(65) Prior Publication Data
US 2016/0039637 A1 Feb. 11, 2016

(51) Int. Cl.
*B66B 5/02* (2006.01)
*B66D 5/30* (2006.01)
(Continued)

(52) U.S. Cl.
CPC ............. *B66B 5/02* (2013.01); *B66B 11/08* (2013.01); *B66D 5/08* (2013.01); *B66D 5/30* (2013.01);
(Continued)

(58) Field of Classification Search
CPC ... F16D 2121/22; F16D 2121/14; B66D 5/08; B66D 5/30
(Continued)

(56) References Cited

U.S. PATENT DOCUMENTS

2004/0262102 A1* 12/2004 Ota ..................... B66D 5/08
188/161

FOREIGN PATENT DOCUMENTS

| DE | 10297127 B4 * | 4/2010 | ......... B66B 11/0438 |
| EP | 1988051 A1 * | 11/2008 | ............... B66D 5/08 |
| JP | 2003-201080 A | 7/2003 | |
| JP | 2005-502838 A | 1/2005 | |
| JP | 2006089162 A * | 4/2006 | |

(Continued)

OTHER PUBLICATIONS

Machined translation of JP-2003201080 (Description only).*
International Search Report dated Jun. 25, 2013 for PCT/JP2013/062032 filed on Apr. 24, 2013.

*Primary Examiner* — Robert A Siconolfi
*Assistant Examiner* — San Aung
(74) *Attorney, Agent, or Firm* — Oblon, McClelland, Maier & Neustadt, L.L.P.

(57) ABSTRACT

In a braking apparatus, a forcing device forces a movable portion in a direction that places a friction member in contact with a rotating body. A braking force releasing device displaces the movable portion in a direction in which the friction member separates from the rotating body in opposition to the forcing device. A buffering member is disposed between a fixed portion and the movable portion, and is made of a flexible material. A deforming device deforms the buffering member by pressing the buffering member in a direction that is perpendicular to the direction of displacement of the movable portion.

9 Claims, 9 Drawing Sheets (51) Int. Cl.
*B66D 5/08* (2006.01)
*F16D 51/10* (2006.01)
*F16D 65/22* (2006.01)
*F16D 51/00* (2006.01)
*B66B 11/08* (2006.01)
*F16D 55/28* (2006.01)
*F16D 65/00* (2006.01)
*F16D 65/14* (2006.01)
*F16D 65/18* (2006.01)
F16D 121/14 (2012.01)
F16D 121/22 (2012.01)

(52) U.S. Cl.
CPC ............ *F16D 51/00* (2013.01); *F16D 51/10* (2013.01); *F16D 55/28* (2013.01); *F16D 65/00* (2013.01); *F16D 65/14* (2013.01); *F16D 65/18* (2013.01); *F16D 65/22* (2013.01); *F16D 2121/14* (2013.01); *F16D 2121/22* (2013.01)

(58) Field of Classification Search
USPC .................................. 188/78, 73.36; 187/254
See application file for complete search history.

(56) References Cited

FOREIGN PATENT DOCUMENTS

| | | | |
|---|---|---|---|
| JP | 2008-120524 A | | 5/2008 |
| JP | 2013160304 A | * | 8/2013 |
| WO | 03/023245 A1 | | 3/2003 |
| WO | WO-2012032573 | * | 3/2012 |

* cited by examiner

BRAKING APPARATUS, ELEVATOR HOISTING MACHINE THAT USES SAME, AND BUFFERING REACTION FORCE ADJUSTING METHOD FOR A BRAKING APPARATUS

TECHNICAL FIELD

The present invention relates to a braking apparatus in which a buffering member that is constituted by a flexible material is disposed between a fixed portion and a movable portion, to an elevator hoisting machine that uses the same, and to a buffering reaction force adjusting method for a braking apparatus.

BACKGROUND ART

In electromagnetic braking apparatuses of conventional elevator hoisting machines, a plurality of insertion apertures are disposed on a surface of a fixed core that faces an armature. A rubber buffering member that reduces operating noise of the armature is inserted into each of the insertion apertures. The buffering members protrude from the insertion apertures (see Patent Literature 1, for example).

In electromagnetic braking apparatuses such as that described above, one problem has been that operating noise of the armature increases when the buffering members deteriorate. Deterioration worsens at high temperatures, for example, making the rubber buffering members smaller and harder. As a result thereof, reaction forces from the buffering members become lower than at first, giving rise to situations such as operating noise being increased, etc.

In answer to that, methods in which quality of operating noise is maintained by replacing the buffering members are also conceivable, but dismantling of the electromagnetic braking apparatuses may be difficult, depending on the construction or installed state of the electromagnetic braking apparatus, making it difficult to replace the buffering members.

On the other hand, compression-spring-type electromagnetic braking apparatuses have also been proposed that include mechanisms that push the buffering members directly in an axial direction using screws, etc. (see Patent Literature 2, for example).

CITATION LIST

Patent Literature

[Patent Literature 1]
    Japanese Patent Laid-Open No. 2008-120524 (Gazette)
[Patent Literature 2]
    Japanese Patent Laid-Open No. 2005-502838 (Gazette)

SUMMARY OF THE INVENTION

Problem to be Solved by the Invention

However, in the conventional electromagnetic braking apparatus that is disclosed in Patent Literature 2, one problem has been that even if the buffering member is pushed out and the amount of protrusion is restored to its initial state, required reaction force characteristics cannot be ensured if the buffering member itself has deteriorated and hardened.

The present invention aims to solve the above problems and an object of the present invention is to provide a braking apparatus, an elevator hoisting machine that uses the same, and a buffering reaction force adjusting method for a braking apparatus, that enable reaction force characteristics of a buffering member to be adjusted without replacing the buffering member.

Means for Solving the Problem

In order to achieve the above object, according to one aspect of the present invention, there is provided a braking apparatus including: a fixed portion; a movable portion that is displaceable toward and away from the fixed portion; a friction member that is disposed on the movable portion, and that brakes rotation of a rotating body by being placed in contact with the rotating body; a forcing device that forces the movable portion in a direction that places the friction member in contact with the rotating body; a braking force releasing device that displaces the movable portion in a direction in which the friction member separates from the rotating body in opposition to the forcing device; a buffering member that is disposed between the fixed portion and the movable portion, and that is made of a flexible material; and a deforming device that deforms the buffering member by pressing the buffering member in a direction that is perpendicular to the direction of displacement of the movable portion.

According to another aspect of the present invention, there is provided an elevator hoisting machine including: a rotating body that has a driving sheave around which is wound a suspending body that suspends a car and a counterweight; a motor that rotates the rotating body; and a braking apparatus that brakes rotation of the rotating body, the braking apparatus including: a fixed portion; a movable portion that is displaceable toward and away from the fixed portion; a friction member that is disposed on the movable portion, and that brakes rotation of the rotating body by being placed in contact with the rotating body; a forcing device that forces the movable portion in a direction that places the friction member in contact with the rotating body; a braking force releasing device that displaces the movable portion in a direction in which the friction member separates from the rotating body in opposition to the forcing device; a buffering member that is disposed between the fixed portion and the movable portion, and that is made of a flexible material; and a deforming device that deforms the buffering member by pressing the buffering member in a direction that is perpendicular to the direction of displacement of the movable portion.

According to yet another aspect of the present invention, there is provided a buffering reaction force adjusting method for a braking apparatus including: a fixed portion; a movable portion that is displaceable toward and away from the fixed portion; a friction member that is disposed on the movable portion, and that brakes rotation of a rotating body by being placed in contact with the rotating body; a forcing device that forces the movable portion in a direction that places the friction member in contact with the rotating body; a braking force releasing device that displaces the movable portion in a direction in which the friction member separates from the rotating body in opposition to the forcing device; and a buffering member that is disposed between the fixed portion and the movable portion, and that is made of a flexible material, wherein, by pressing the buffering member in a direction that is perpendicular to a direction of displacement of the movable portion to deform the buffering member so as to change a dimension of the buffering member in the direction of displacement of the movable portion, the buffering reaction force adjusting method for the braking apparatus adjusts reaction force characteristics of the buffering member during collisions with the movable portion or the fixed portion.

EFFECTS OF THE INVENTION

The braking apparatus, the elevator hoisting machine that uses the same, and the buffering reaction force adjusting method for a braking apparatus according to the present invention enable reaction force characteristics of a buffering member to be adjusted without replacing the buffering member by pressing the buffering member in a direction that is perpendicular to a direction of displacement of a movable portion to deform the buffering member.

DESCRIPTION OF EMBODIMENTS

Preferred embodiments of the present invention will now be explained with reference to the drawings.
Embodiment 1

Figure 1:
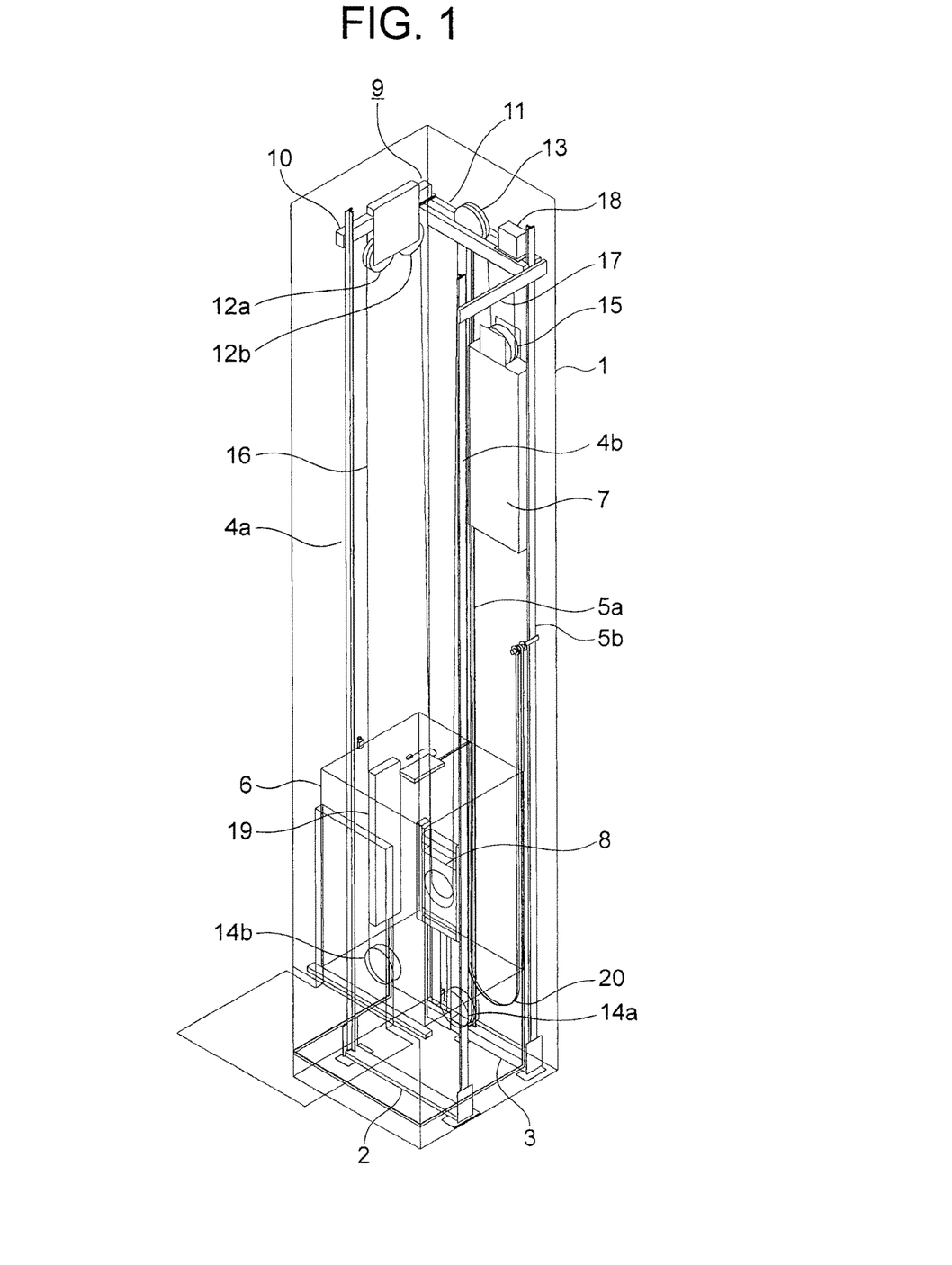
FIG. 1 is an oblique projection that shows an elevator according to Embodiment 1 of the present invention.

FIG. 1 is an oblique projection that shows an elevator according to Embodiment 1 of the present invention, and shows the interior of a hoistway transparently. In the figure, a car buffer base 2 and a counterweight buffer base 3 are fixed to a bottom portion of a hoistway 1. A car buffer (not shown) is installed on the car buffer base 2. A counterweight buffer (not shown) is installed on the counterweight buffer base 3.

A pair of car guide rails 4a and 4b and a pair of counterweight guide rails 5a and 5b are installed inside the hoistway 1. Lower end portions of the car guide rails 4a and 4b are positioned on the car buffer base 2. Lower end portions of the counterweight guide rails 5a and 5b are positioned on the counterweight buffer base 3.

A car 6 is raised and lowered inside the hoistway 1 so as to be guided by the car guide rails 4a and 4b. A counterweight 7 is raised and lowered inside the hoistway 1 so as to be guided by the counterweight guide rails 5a and 5b. The counterweight 7 is disposed behind the car 6 so as to face a back surface of the car 6 when positioned level with the car 6.

An elevator hoisting machine 8 that raises and lowers the car 6 and the counterweight 7 is installed in a lower portion inside the hoistway 1. A thin hoisting machine in which an axial dimension is smaller than dimensions that are perpendicular to an axial direction is used as the elevator hoisting machine 8.

An L-shaped return sheave beam 9 is installed in a top portion of the hoistway 1. The return sheave beam 9 has: a car return sheave beam 10; and a counterweight return sheave beam 11 that is linked perpendicularly to a first end portion of the car return sheave beam 10.

A pair of car return sheaves 12a and 12b are supported by the car return sheave beam 10. A counterweight return sheave 13 is supported by the counterweight return sheave beam 11.

A pair of car suspending sheaves 14a and 14b are disposed on a lower portion of the car 6. A counterweight suspending sheave 15 is disposed on an upper portion of the counterweight 7.

The car 6 and the counterweight 7 are suspended inside the hoistway 1 by a plurality of main ropes 16 (only one is shown in the figure) that constitute a suspending body.

A rope fastener beam 17 is fixed horizontally between a vicinity of an upper end portion of a car guide rail 4b and a vicinity of an upper end portion of the counterweight guide rail 5b. A car rope fastener portion (not shown) is disposed on the rope fastener beam 17. A counterweight rope fastener portion 18 is disposed on the counterweight return sheave beam 11.

The main ropes 16 have: first end portions that are connected to the car rope fastener portion; and second end portions that are connected to the counterweight rope fastener portion 18. The main ropes 16 are wound from near the first end portions sequentially around the car suspending sheaves 14a and 14b, the car return sheaves 12a and 12b, the elevator hoisting machine 8, the counterweight return sheave 13, and the counterweight suspending sheave 15 (two-to-one (2:1) roping).

A controlling board 19 is installed on a hoistway wall in a vicinity of a lowermost floor. An elevator controlling apparatus that controls movement of the car 6 is disposed on the controlling board 19. A controlling cable 20 is suspended between the hoistway wall and the car 6.

Figure 2:
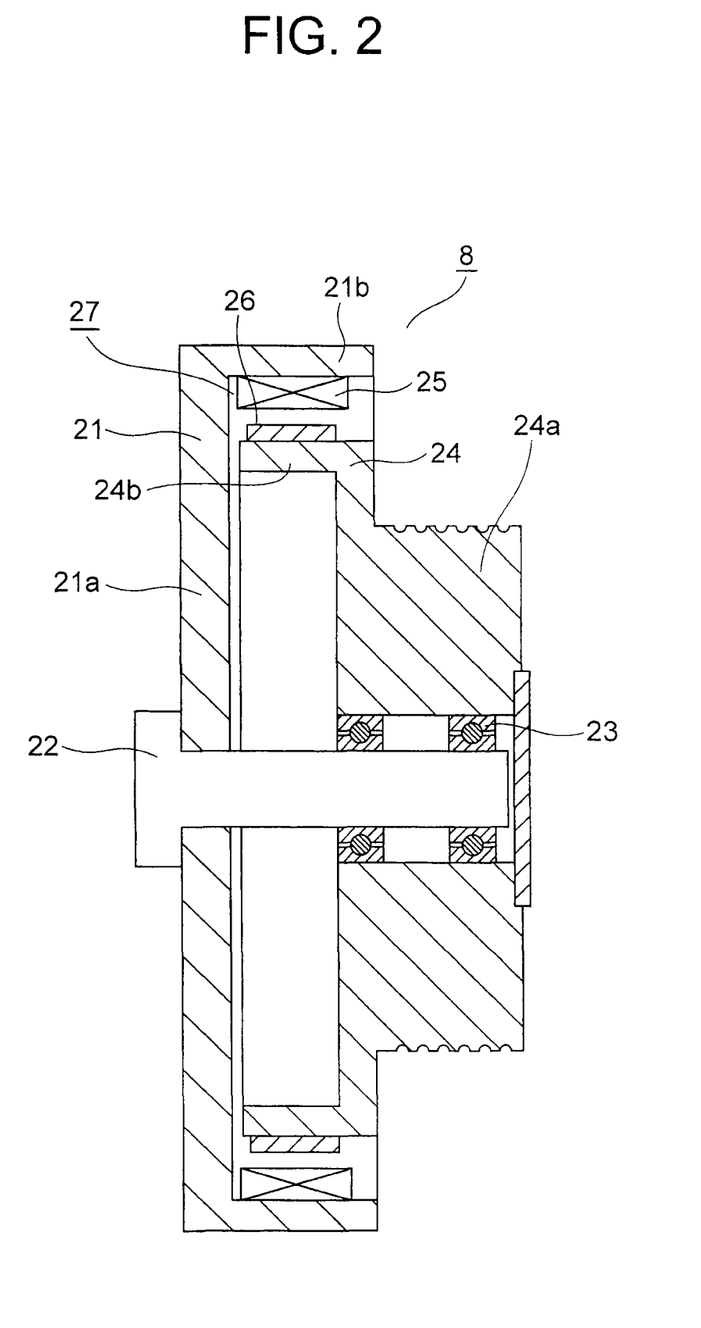
FIG. 2 is a schematic cross section that is taken parallel to a shaft axis of an elevator hoisting machine from FIG. 1.

FIG. 2 is a schematic cross section that is taken parallel to a shaft axis of the elevator hoisting machine 8 from FIG. 1. The housing 21 has: a flat shaft supporting portion 21a; and a cylindrical stator supporting portion 21b that protrudes outward from the shaft supporting portion 21a on a first side. A horizontal fixed shaft 22 is cantilevered centrally on the shaft supporting portion 21a.

A rotating body 24 is rotatably supported on the fixed shaft 22 by means of a pair of bearings 23. The bearings 23 are disposed so as to be spaced apart from each other in an axial direction of the fixed shaft 22. A cylindrical driving sheave 24a around which the main ropes 16 are wound and a cylindrical magnet supporting portion 24b that faces an inner circumferential surface of the stator supporting portion 21b are disposed integrally on the rotating body 24.

A plurality of rope grooves into which the main ropes 16 are inserted are disposed on an outer circumferential surface of the driving sheave 24a. The stator supporting portion 21b is disposed on an axial end portion of the rotating body 24 near the housing 21. The magnet supporting portion 24b is disposed so as to be coaxial to the stator supporting portion 21b, and is surrounded by the stator supporting portion 21b. Furthermore, an outside diameter of the magnet supporting portion 24b is larger than a diameter of the driving sheave 24a.

A stator 25 onto which coils are wound is fixed to an inner circumferential surface of the stator supporting portion 21b. A plurality of permanent magnets 26 that face the stator 25 are fixed to an outer circumferential surface of the magnet supporting portion 24b so as to have uniform spacing in a circumferential direction. The motor 27 is constituted by this stator 25 and the permanent magnets 26, and the rotating body 24 is rotated by a driving force from the motor 27 such that the car 6 and the counterweight 7 are raised and lowered.

Figure 3:
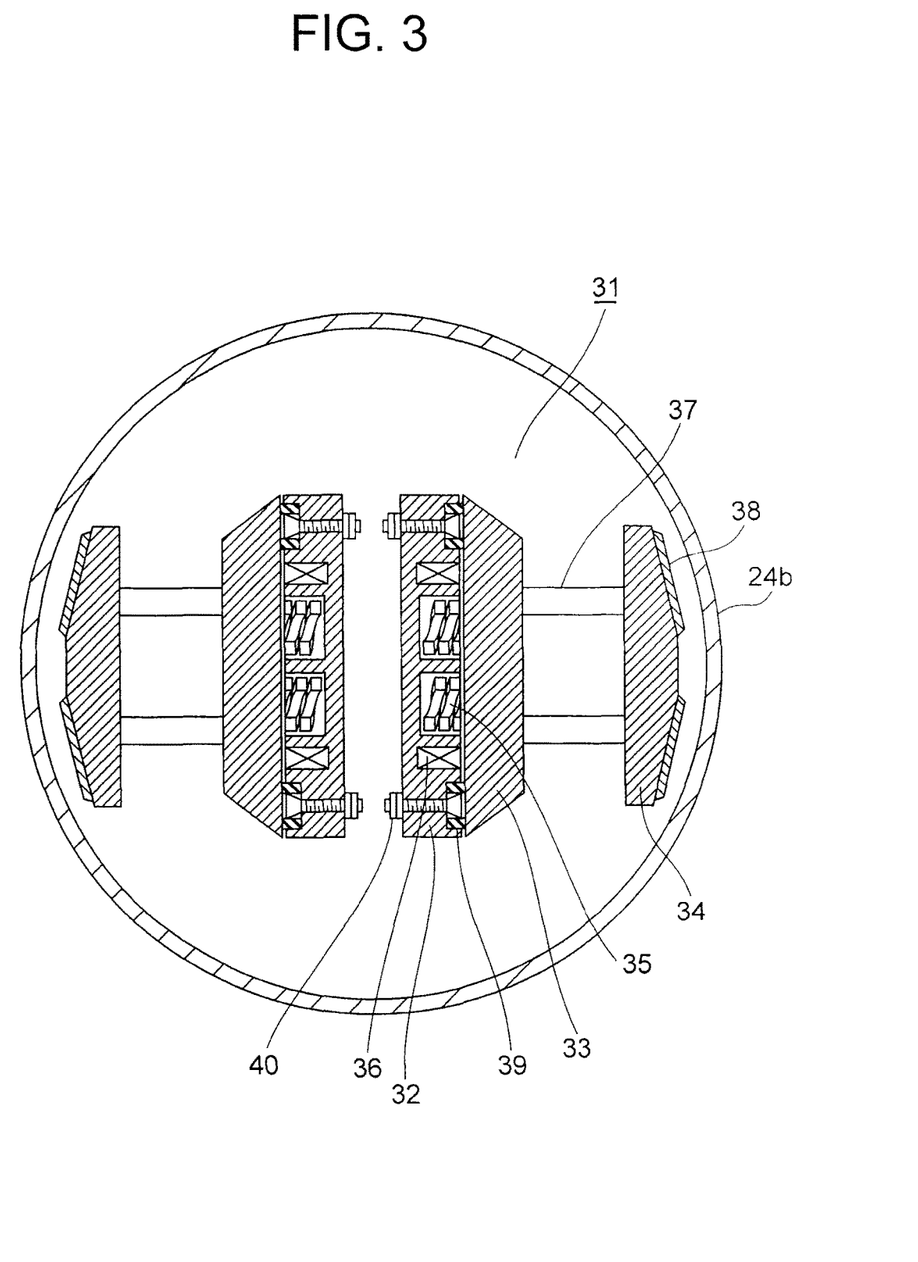
FIG. 3 is a cross section that is perpendicular to a shaft axis of a magnet supporting portion from FIG. 2.

FIG. 3 is a cross section that is perpendicular to a shaft axis of the magnet supporting portion 24b from FIG. 2. Although omitted from FIG. 2, a pair of braking apparatuses 31 that brake rotation of the rotating body 24 are accommodated inside the magnet supporting portion 24b. The braking apparatuses 31 have similar or identical constructions to each other, and are disposed so as to be oriented in opposite directions to each other.

Each of the braking apparatuses 31 has: a fixed core (a field) 32 that functions as a fixed portion; a movable core (an armature) 33 that functions as a movable portion; a brake shoe 34 that functions as a friction member; a plurality of brake springs 35 that function as a forcing device; and an electromagnetic coil 36 that functions as a braking force releasing device.

The movable cores 33 are displaceable in directions of contact with and separation from the fixed cores 32 (left and right in FIG. 3). The brake shoes 34 are linked to the movable cores 33 by means of pairs of arms 37 so as to displace together with the movable cores 33.

The brake shoes 34 brake rotation of the rotating body 24, or hold a stationary state of the rotating body 24, by being placed in contact with an inner circumferential surface of the magnet supporting portion 24b that constitutes a braking surface. In other words, the magnet supporting portion 24b also serves as a brake drum. A plurality of brake linings 38 are fixed to portions of the brake shoes 34 that come into contact with the magnet supporting portion 24b.

The brake springs 35 force the movable cores 33 in directions that place the brake shoes 34 in contact with the braking surface. When energized, the electromagnetic coils 36 displace the movable cores 33 in directions in which the brake shoes 34 separate from the braking surface in opposition to spring forces from the brake springs 35.

In other words, when the electromagnetic coils 36 are energized, electromagnetic forces are generated, and the movable cores 33 are attracted to the fixed cores 32, separating the brake shoes 34 from the braking surface, and releasing braking force. When the passage of electric current to the electromagnetic coils 36 is interrupted, the brake shoes 34 are pressed against the braking surface by the spring forces from the brake springs 35. At this point, as shown in FIG. 4, the movable cores 33 are separated from the fixed cores 32.

A plurality of buffering members 39 that reduce operating noise of the movable cores 33 are disposed between the fixed cores 32 and the movable cores 33. Each of the buffering members 39 is constituted by a flexible material such as rubber, a soft plastic, or a resin, etc., except for a metal spring.

A plurality of deforming devices 40 are disposed on the fixed cores 32 so as to have one-to-one correspondence to the buffering members 39. Each of the deforming devices 40 presses the corresponding buffering member 39 in a direction that is perpendicular to the direction of displacement (left and right in FIG. 3) of the movable core 33 and deforms the buffering member 39 to adjust the reaction force characteristics of the buffering member 39.

Figure 4:
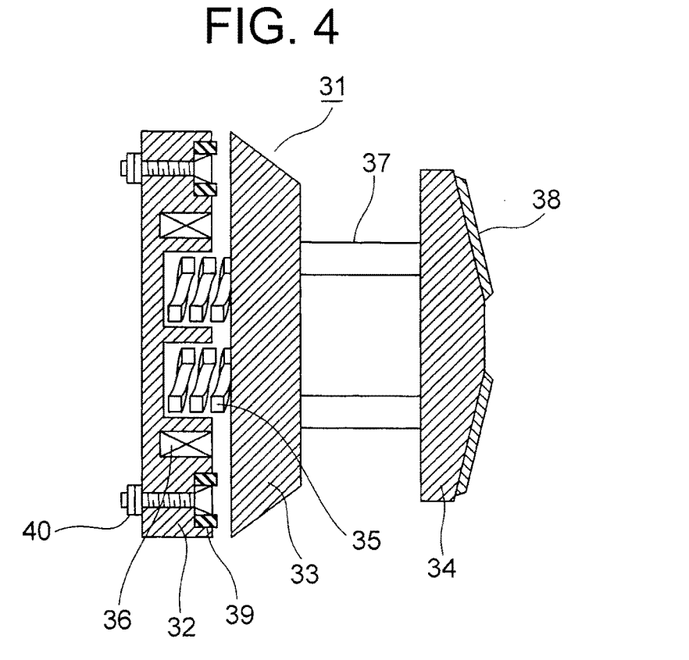
FIG. 4 is a cross section that shows a state of a braking apparatus from FIG. 3 when braking.
Figure 5:
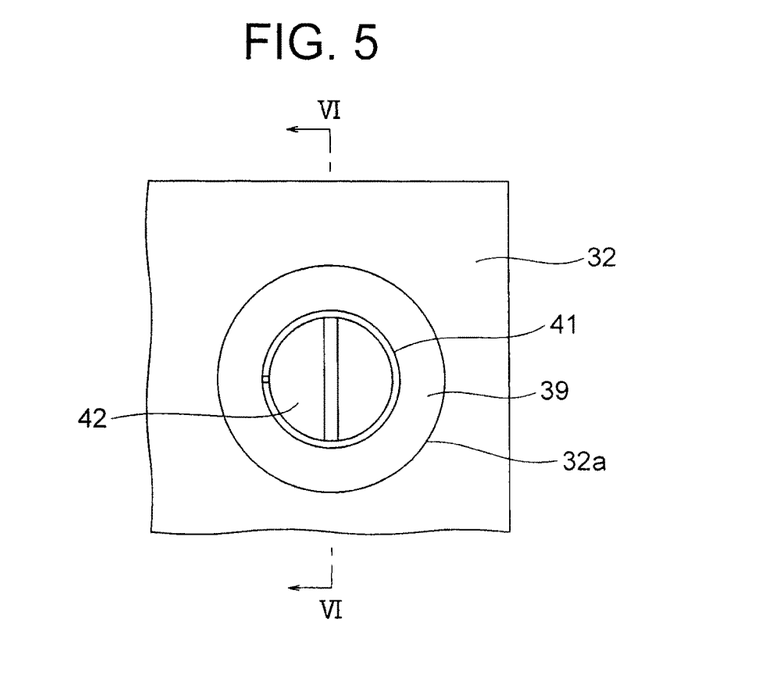
FIG. 5 is a front elevation that shows a portion of a fixed core from FIG. 4 enlarged.
Figure 6:
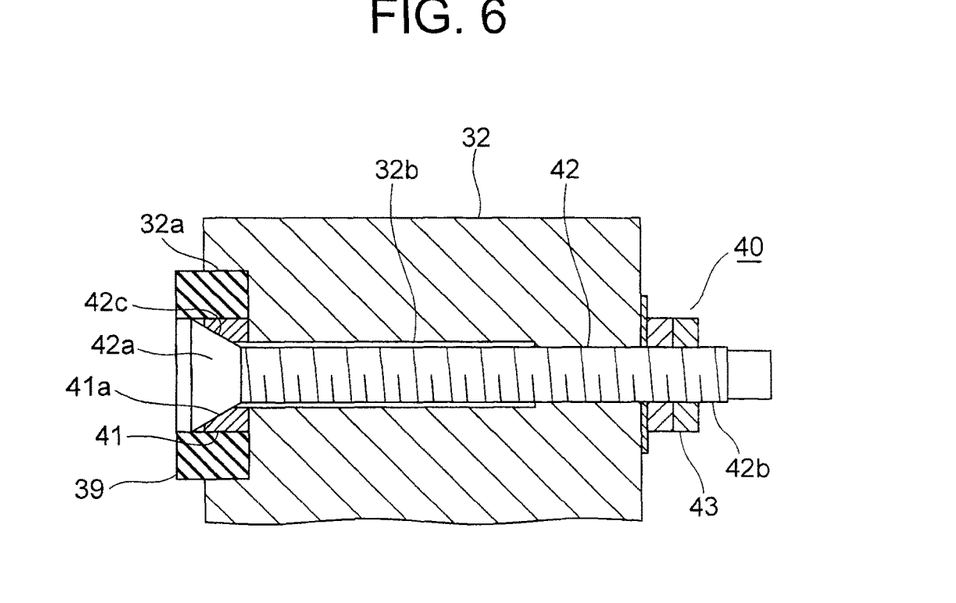
FIG. 6 is a cross section that is taken along line VI-VI in FIG. 5.

FIG. 5 is a front elevation (a view from a side near the movable core 33) that shows a portion of a fixed core 32 (a portion on which a buffering member 39 is disposed) from FIG. 4 enlarged, and FIG. 6 is a cross section that is taken along line VI-VI in FIG. 5. The buffering members 39 are hollow members, and more specifically, have a cylindrical external shape. A plurality of accommodating recess portions 32a that have circular cross sections that accommodate the buffering members 39 are disposed on the fixed core 32.

A plurality of penetrating apertures 32b that are parallel to the direction of displacement of the movable core 33 (perpendicular to a surface of the fixed core 32 that faces the movable core 33) are disposed on the fixed core 32. Each of the penetrating apertures 32b passes through the accommodating recess portion 32a from a central portion of a bottom surface to a surface on an opposite side of the fixed core 32 from the movable core 33.

Each of the deforming devices 40 has a C-shaped washer 41, an adjusting bolt 42, and a plurality of adjusting nuts 43. The washer 41 is disposed inside the buffering member 39 so as to be coaxial with the buffering member 39. An outer circumferential surface of the washer 41 contacts an inner circumferential surface of the buffering member 39. In addition, the washer 41 has a tapered inner circumferential surface 41a.

The adjusting bolt 42 is inserted through the penetrating aperture 32b. The adjusting bolt 42 has: a washer-side end portion 42a that is disposed inside the washer 41 inside the recess portion 32a; and a washer-opposite end portion 42b that protrudes outward from a surface at an opposite end of the fixed core 32 from the movable core 33. An outer circumferential tapered surface 42c that matches with the inner circumferential surface 41a of the washer 41 is disposed on the washer-side end portion 42a.

Figure 7:
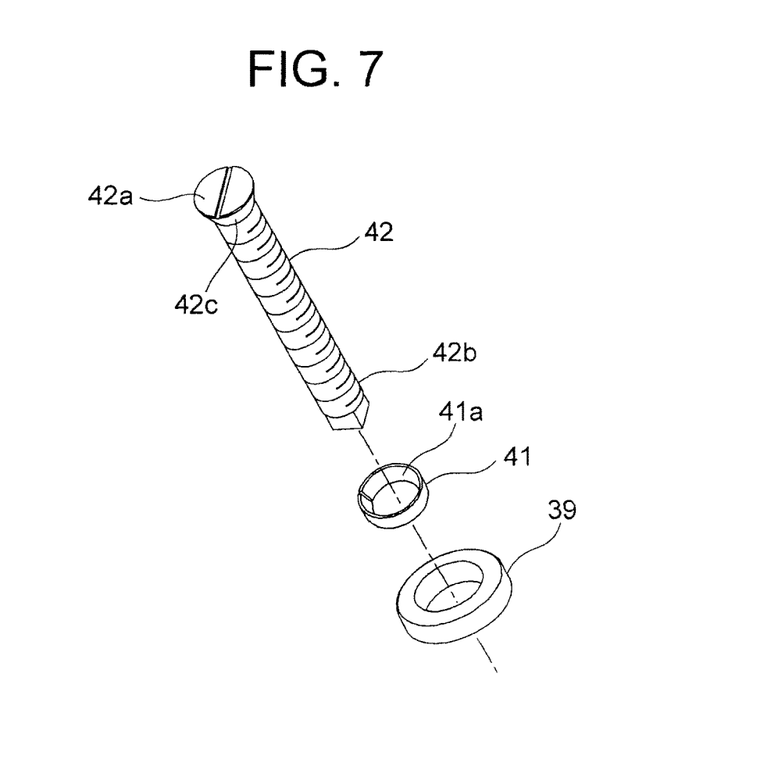
FIG. 7 is an exploded oblique projection that shows a buffering member, a washer, and an adjusting bolt from FIG. 6.

An adjusting nut 43 is screwed onto the washer-opposite end portion 42b of the adjusting bolt 42. An axial position of the adjusting bolt 42 is adjusted by rotating the adjusting nut 43. FIG. 7 is an exploded oblique projection that shows the buffering member 39, the washer 41, and the adjusting bolt 42 from FIG. 6.

Using a configuration of this kind, the deforming device 40 according to Embodiment 1 expands the inside diameter of the buffering member 39 by pressing the inner circumferential surface thereof. Specifically, the outer circumferential tapered surface 42c is moved along the inner circumferential surface 41a of the washer 41 by fastening the adjusting nut 43 to displace the adjusting bolt 42 away from the movable core 33. Thus, the gap of the C-shaped washer 41 is widened and the outside diameter of the washer 41 is enlarged, pressing the inner circumferential surface of the buffering member 39 radially outward.

Figure 8:
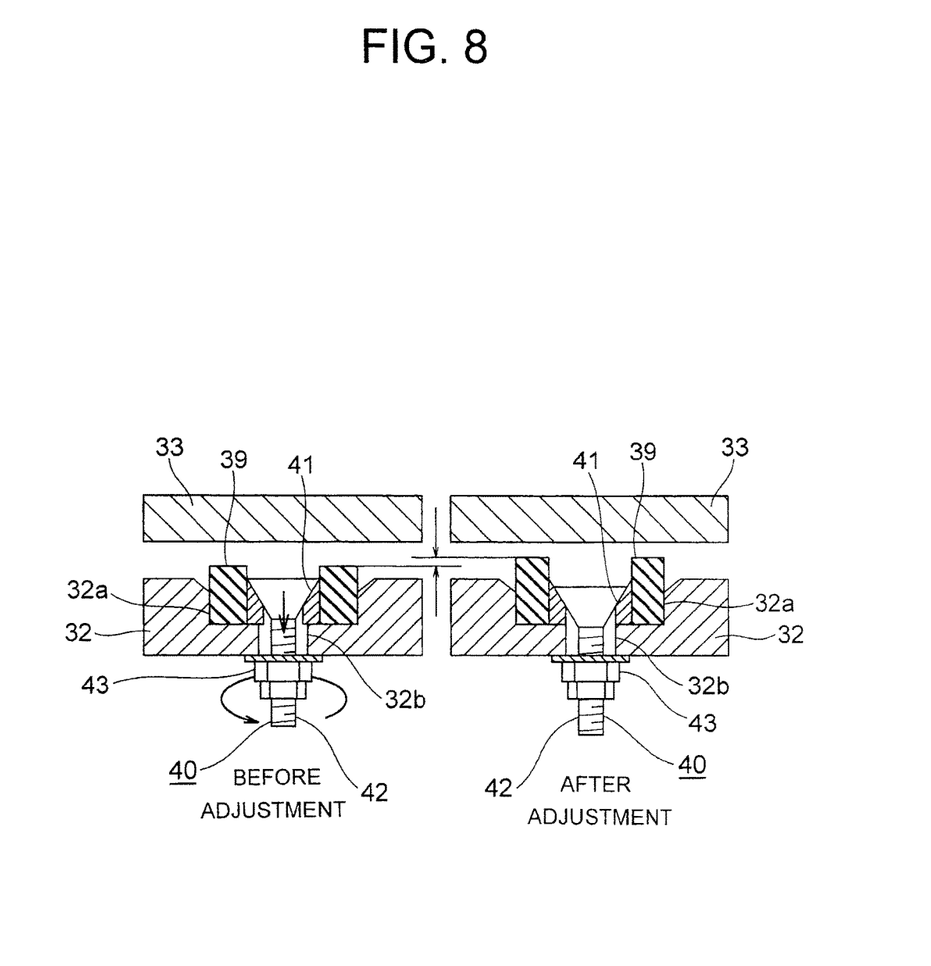
FIG. 8 is an explanatory diagram that shows a comparison of states before and after reaction force adjustment of the buffering member by a deforming device from FIG. 7.

FIG. 8 is an explanatory diagram that shows a comparison of states before and after reaction force adjustment of the buffering member 39 by the deforming device 40 from FIG. 7. When the adjusting bolt 42 is moved away from the movable core 33 by adjusting the screw fastening position of the adjusting nut 43 relative to the adjusting bolt 42, the inner circumferential surface 41a of the buffering member 39 is pressed radially outward by the washer 41, as described above.

At this point, the outer circumferential surface of the buffering member 39 is placed in contact with the inner circumferential surface of the recess portion 32a, and the outside diameter of the buffering member 39 does not change. Because of that, an axial dimension of the buffering member 39 is increased, increasing the amount of protrusion of the buffering member 39 from the fixed core 32. The reaction force of the buffering member 39 during collision with the movable core 33 increases therewith.

In a braking apparatus 31 of this kind, the reaction force characteristics of the buffering members 39 can be adjusted without replacing the buffering members 39 (without dismantling the fixed core 32 and the movable core 33), by adjusting the axial position of the adjusting bolts 42. In other words, not only the amount of protrusion of the buffering members 39 but also the spring modulus can be adjusted.

Moreover, in Embodiment 1, a cylindrical buffering member is shown, but a buffering member that has a circular cross section such as that of an O ring may be used.

In Embodiment 1, the diameter of the washer 41 is enlarged by an adjusting bolt 42 that has an outer circumferential tapered surface 42c, but the construction may be made such that the diameter of the washer 41 is enlarged by insertion of a member such as a wedge into the gap of the washer 41.

In addition, in Embodiment 1, a C-shaped washer 41 has been used, but a washer that is divided into a plurality of parts in a circumferential direction may be used. A washer that is formed by combining two semicircular segments may be used, for example.

Embodiment 2

Figure 9:
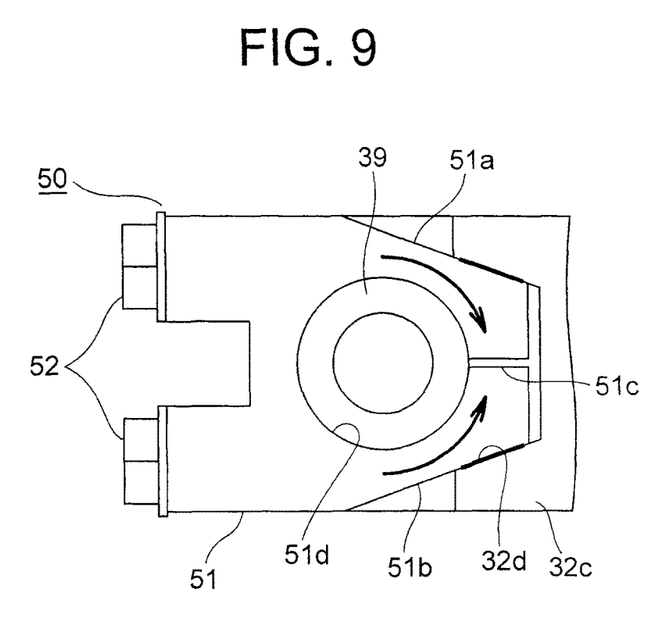
FIG. 9 is a front elevation that shows part of a braking apparatus according to Embodiment 2 of the present invention.
Figure 10:
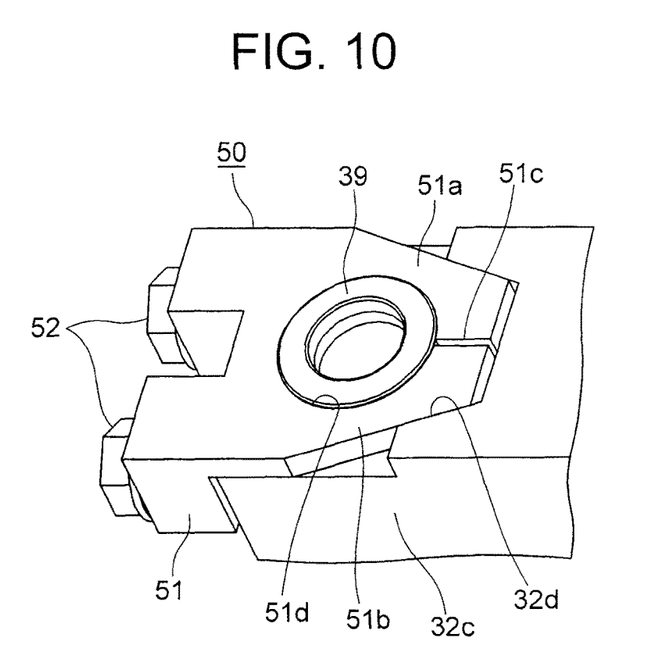
FIG. 10 is an oblique projection that shows part of the braking apparatus in FIG. 9.

Next, FIG. 9 is a front elevation that shows part of a braking apparatus according to Embodiment 2 of the present invention, and FIG. 10 is an oblique projection that shows part of the braking apparatus in FIG. 9. A deforming device 50 according to Embodiment 3 has: a holder 51 that holds a buffering member 39; a holder mounting portion 32c that is disposed on a fixed core 32; and a pair of adjusting bolts 52 that attach the holder 51 to the holder mounting portion 32c.

Figure 11:
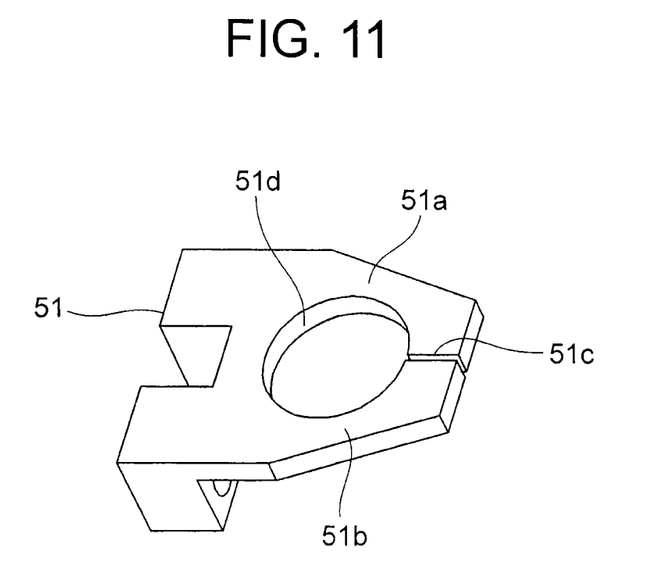
FIG. 11 is an oblique projection that shows a holder from FIG. 9.

The holder 51 has a pair of clamping portions 51a and 51b that hold the buffering member 39. A gap 51c is disposed between tip end portions of the clamping portions 51a and 51b. In other words, a C-shaped inner peripheral surface 51d that contacts an outer circumferential surface of the buffering member 39 is formed on the holder 51, as shown in FIG. 11.

A tapered groove 32d with which the tip end portions of the clamping portions 51a and 51b engage is disposed on the holder mounting portion 32c. A shape of the tip end portions of the clamping portions 51a and 51b is a wedge shape that corresponds to a shape of the groove 32d.

The adjusting bolts 52 pass through the holder 51 and are screwed into screw-threaded apertures (not shown) that are disposed on a side surface of the fixed core 32. An axial direction of the adjusting bolts 52 (left and right in FIG. 9) is a direction that is perpendicular to a direction of displacement of a movable core 33 (perpendicular to the surface of the page in FIG. 9).

The holder 51 is moved to the right in FIG. 9, and the tip end portions of the clamping portions 51a and 51b are pressed into the groove 32d, by fastening the adjusting bolts 52. The gap 51c is reduced thereby, reducing the external shape of the buffering member 39. In other words, the deforming device 50 reduces the outside diameter of the buffering members 39 by pressing the outer circumferential surfaces of the buffering members 39. The rest of the configuration is similar or identical to that of Embodiment 1.

In a braking apparatus 31 of this kind, the reaction force characteristics of the buffering member 39 can be adjusted without replacing the buffering member 39 (without dismantling the fixed core 32 and the movable core 33), by adjusting the amount of fastening of the adjusting bolts 52. In other words, not only the amount of protrusion of the buffering member 39 but also the spring modulus can be adjusted.

Embodiment 3

Figure 12:
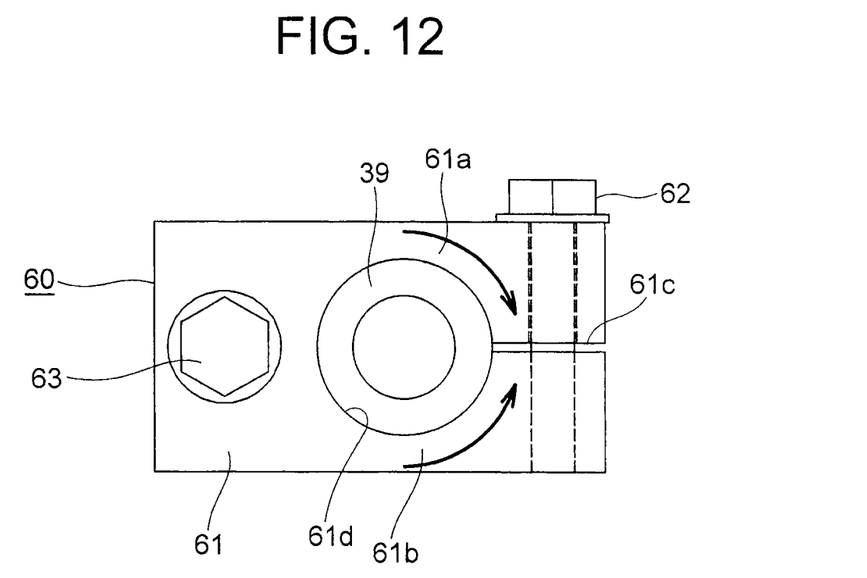
FIG. 12 is a front elevation that shows part of a braking apparatus according to Embodiment 3 of the present invention.

Next, FIG. 12 is a front elevation that shows part of a braking apparatus according to Embodiment 3 of the present invention. A deforming device 60 according to Embodiment 3 has: a holder 61 that holds a buffering member 39; an adjusting bolts 62 that is disposed on the holder 61; and a fixing bolt 63 that fixes the holder 61 to a surface of a fixed core 32 that faces a movable core 33.

The holder 61 has a pair of clamping portions 61a and 61b that hold the buffering member 39. A gap 61c is disposed between tip end portions of the clamping portions 61a and 61b. In other words, a C-shaped inner peripheral surface 61d that contacts an outer circumferential surface of the buffering member 39 is formed on the holder 61.

The adjusting bolt 62 is disposed so as to span the tip end portions of the clamping portions 61a and 61b. The adjusting bolt 62 passes through the tip end portion of a clamping portion 61a, and is screwed into a screw-threaded aperture that is disposed on a tip end portion of a clamping portion 61b.

An axial direction of the adjusting bolt 62 (up and down in FIG. 12) is a direction that is perpendicular to a direction of displacement of a movable core 33 (perpendicular to the surface of the page in FIG. 12). An axial direction of the fixing bolt 63 is parallel to the direction of displacement of the movable core 33.

A recess portion that accommodates the holder 61 is disposed on the fixed core 32 such that only an end portion of the buffering member 39 near the movable core 33 protrudes beyond a surface of the fixed core 32 that faces the movable core 33. In addition, the tip end portions of the clamping portions 61a and 61b and the adjusting bolt 62 protrude further outward than the side surface of the fixed core 32 such that manipulation of the adjusting bolt 62 can be performed without dismantling the fixed core 32 and the movable core 33.

By fastening the adjusting bolt 62, the gap 61c is made smaller, reducing the external shape of the buffering member 39. Specifically, the deforming device 60 reduces the outside diameter of the buffering member 39 by pressing the outer circumferential surface of the buffering member 39. The rest of the configuration is similar or identical to that of Embodiment 1.

In a braking apparatus 31 of this kind, the reaction force characteristics of the buffering member 39 can be adjusted without replacing the buffering member 39 (without dismantling the fixed core 32 and the movable core 33), by adjusting the amount of fastening of the adjusting bolt 62. In other words, not only the amount of protrusion of the buffering member 39 but also the spring modulus can be adjusted.

Moreover, in Embodiment 3, the adjusting bolt 62 is screwed into the screw-threaded aperture of a clamping portion 61*b*, but an adjusting nut may be screwed onto a tip end portion of an adjusting bolt 62 that is passed through both of the clamping portions 61*a* and 61*b*.

Embodiment 4

Figure 13:
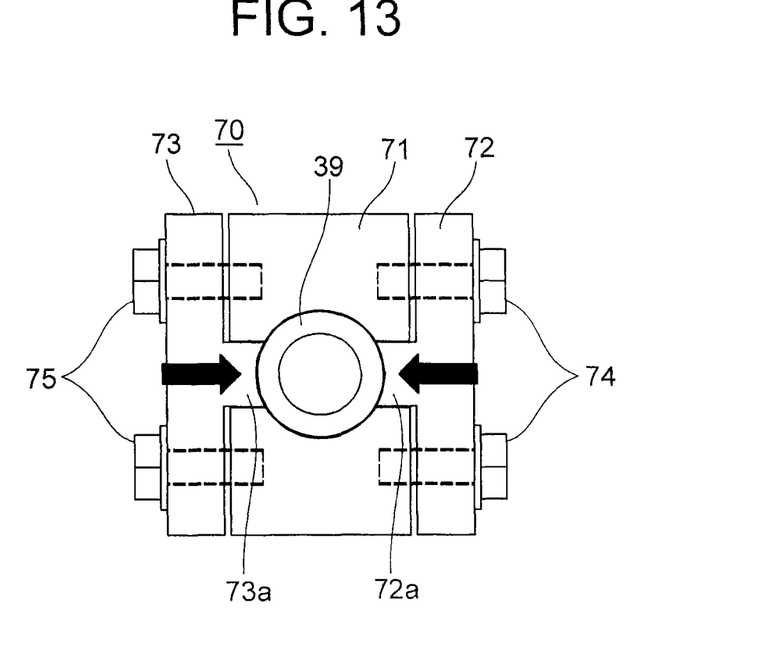
FIG. 13 is a front elevation that shows part of a braking apparatus according to Embodiment 4 of the present invention.

Next, FIG. 13 is a front elevation that shows part of a braking apparatus according to Embodiment 4 of the present invention. A deforming device 70 according to Embodiment 4 has: a holder 71 that holds a buffering member 39; first and second adjusting brackets 72 and 73; a pair of first adjusting bolts 74 that pass through the first adjusting bracket 72 and are screwed into the holder 71; and a pair of second adjusting bolts 75 that pass through the second adjusting bracket 73 and are screwed into the holder 71.

A portion of the first adjusting bracket 72 is placed in contact with an outer circumferential surface of the buffering member 39. Specifically, the first adjusting bracket 72 has a first protruding portion 72*a* that is placed in contact with the outer circumferential surface of the buffering member 39.

A portion of the second adjusting bracket 73 is placed in contact with the outer circumferential surface of the buffering member 39. Specifically, the second adjusting bracket 73 has a second protruding portion 73*a* that is placed in contact with the outer circumferential surface of the buffering member 39. The first and second protruding portions 72*a* and 73*a* face each other from opposite sides of the buffering member 39.

Axial directions (left and right in FIG. 13) of the adjusting bolts 74 and 75 are directions that are perpendicular to a direction of displacement of a movable core 33 (a direction that is perpendicular to the surface of the page in FIG. 13). The holder 71 is fixed to a fixed core 32. The holder 71 is accommodated in a recess portion that is disposed on the fixed core 32. Thus, only an end portion of the buffering member 39 near the movable core 33 protrudes from a surface of the fixed core 32 that faces the movable core 33.

The adjusting bolts 74 and 75 are operable from outside, directly or through operating apertures that are disposed on the fixed core 32, without dismantling the fixed core 32 and the movable core 33.

The adjusting brackets 72 and 73 are displaced toward the holder 71, and the outside diameter of the buffering member 39 is reduced, by fastening the adjusting bolts 74 and 75. Specifically, the deforming device 70 reduces the outside diameter of the buffering member 39 by pressing the outer circumferential surface of the buffering member 39. The rest of the configuration is similar or identical to that of Embodiment 1.

In a braking apparatus 31 of this kind, the reaction force characteristics of the buffering member 39 can be adjusted without replacing the buffering member 39 (without dismantling the fixed core 32 and the movable core 33), by adjusting the amount of fastening of the adjusting bolts 74 and 75. In other words, not only the amount of protrusion of the buffering member 39 but also the spring modulus can be adjusted.

Moreover, in Embodiment 4, the buffering member 39 was able to be pressed by the first and second adjusting brackets 72 and 73 from two sides, but may alternatively be made able to be pressed from only one side.

Embodiment 5

Figure 14:
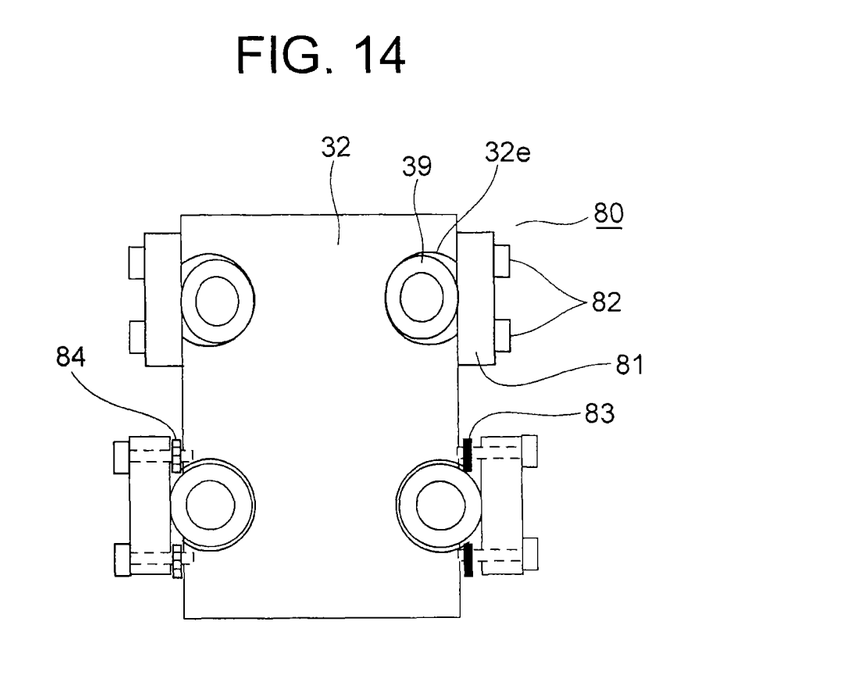
FIG. 14 is a front elevation that shows part of a braking apparatus according to Embodiment 5 of the present invention.

Next, FIG. 14 is a front elevation that shows part of a braking apparatus according to Embodiment 5 of the present invention. In the figure, a plurality of (four in this example) accommodating recess portions 32*e* are disposed on a fixed core 32 that constitutes a buffering member holding portion. Buffering members 39 are accommodated and held in the corresponding accommodating recess portions 32*e*.

End portions of the buffering members 39 near movable cores 33 protrude further toward the movable cores 33 than a surface of the fixed core 32 that faces the movable cores 33. A portion of a side wall of each of the accommodating recess portions 32*e* communicates with an outer portion of the fixed core 32. Portions of outer circumferential surfaces of the buffering members 39 protrude outward from the fixed core 32 in directions that are perpendicular to directions of displacement of the movable cores 33. Thus, the buffering members 39 are replaceable from the directions that are perpendicular to the directions of displacement of the movable cores 33.

Respective deforming devices 80 according to Embodiment 5 have: an adjusting bracket 81 that is placed in contact with a portion of the outer circumferential surface of the buffering member 39 that protrudes outward from the fixed core 32; and a pair of adjusting bolts 82 that pass through the adjusting bracket 81 and are screwed into a side surface of the fixed core 32.

An axial direction of the adjusting bolts 82 (left and right in FIG. 14) is a direction that is perpendicular to the direction of displacement of the movable cores 33 (perpendicular to the surface of the page in FIG. 14). The buffering members 39 are compressed by the adjusting brackets 81 from radially outside. An amount of compression of the buffering members 39 may be adjusted using adjusting shims 83 or adjusting nuts 84. The adjusting bolts 82 pass through the adjusting shims 83 or the adjusting nuts 84 between the adjusting brackets 81 and the fixed core 32.

The adjusting brackets 81 are displaced toward the fixed core 32, and outside diameters of the buffering members 39 are reduced, by fastening the adjusting bolts 82. Specifically, the deforming device 80 reduces the outside diameter of the buffering members 39 by pressing the outer circumferential surfaces of the buffering members 39. The rest of the configuration is similar or identical to that of Embodiment 1.

In a braking apparatus 31 of this kind, the reaction force characteristics of the buffering members 39 can be adjusted without replacing the buffering members 39 (without dismantling the fixed core 32 and the movable core 33), by adjusting the amount of fastening of the adjusting bolts 82. In other words, not only the amount of protrusion of the buffering members 39 but also the spring modulus can be adjusted.

Furthermore, even if a need to replace the buffering members 39 does arise, they can be easily replaced from the directions that are perpendicular to the directions of displacement of the movable cores 33 without dismantling the fixed core 32 and the movable cores 33.

Moreover, in Embodiments 2 through 5, a cylindrical buffering member is shown, but is not limited to this, and a buffering member that has a circular cross section such as that of an O ring, a solid shape, or a spherical shape may be used, for example.

In Embodiments 1 through 5, a buffering member is disposed on a fixed core (a fixed portion), but may be disposed on a movable core (a movable portion).

In addition, the braking apparatuses that are disposed on the elevator hoisting machine are not limited to a particular number.

Furthermore, the construction of the elevator hoisting machine is not limited to the example in FIG. 2. For example, the elevator hoisting machine need not be a thin hoisting machine.

In the above examples, a braking apparatus is disposed inside a brake drum, but a braking apparatus may be disposed outside a brake drum such that a brake shoe is placed in contact with an outer circumferential surface of the brake drum.

In addition, the present invention can be applied to a disc brake if a braking apparatus has a buffering member that is disposed between a fixed portion and a movable portion.

Furthermore, the overall elevator equipment layout and roping method, etc., are not limited to the example in FIG. 1.

The suspending body may be a belt.

In addition, the present invention can be applied to various types of elevator apparatus, such as elevator apparatuses that have a machine room, double-deck elevators, or single-shaft multi-car elevators, for example.

Furthermore, the present invention can be applied to braking apparatuses other than for elevator hoisting machines.

The invention claimed is:

1. A braking apparatus comprising:
a fixed portion;
a movable portion that is displaceable toward and away from the fixed portion;
a friction member that is disposed on the movable portion, and that brakes rotation of a rotating body by being placed in contact with the rotating body;
a forcing device that forces the movable portion in a direction that places the friction member in contact with the rotating body;
a braking force releasing device that displaces the movable portion in a direction in which the friction member separates from the rotating body in opposition to the forcing device;
a buffering member that is disposed between the fixed portion and the movable portion, and that is made of a flexible material; and
a deforming device that deforms the buffering member by pressing the buffering member in a direction that is perpendicular to the direction of displacement of the movable portion, wherein
the buffering member is a hollow member, and
the deforming device is disposed inside the buffering member, and presses an inner circumferential surface of the buffering member so as to expand an inside diameter thereof.

2. The braking apparatus according to claim 1, wherein the buffering member is made of rubber or a resin material, and is disposed in an accommodating recess portion that is disposed on at least one of the fixed portion and the movable portion.

3. The braking apparatus according to claim 1, wherein:
the deforming device comprises:
a washer that has a tapered inner circumferential surface, and an outer circumferential surface of which comes into contact with the inner circumferential surface of the buffering member;
an adjusting bolt that has an outer circumferential tapered surface that matches with the inner circumferential surface of the washer; and
an adjusting nut that is screwed onto the adjusting bolt, and that adjusts an axial position of the adjusting bolt; and
an outside diameter of the washer is enlarged and the inner circumferential surface of the buffering member is pressed radially outward by displacing the adjusting bolt axially.

4. The braking apparatus according to claim 1, wherein:
the deforming device includes:
a holder that holds the buffering member;
a holder mounting portion that is disposed on either one of the fixed portion and the movable portion; and
an adjusting bolt that attaches the holder to the holder mounting portion;
the holder has a pair of clamping portions that hold the buffering member;
a gap is disposed between tip end portions of the clamping portions;
a tapered groove with which the tip end portions of the clamping portions engage is disposed on the holder mounting portion; and
the gap is made smaller such that an external shape of the buffering member is reduced by the tip end portions of the clamping portions being pushed into the groove by fastening the adjusting bolt.

5. The braking apparatus according to claim 1, wherein:
the deforming device includes:
a holder that is mounted to either one of the fixed portion and the movable portion, and that holds the buffering member; and
an adjusting bolt that is disposed on the holder;
the holder has a pair of clamping portions that hold the buffering member;
a gap is disposed between tip end portions of the clamping portions;
the adjusting bolt is disposed so as to span tip end portions of the clamping portions; and
the gap is made smaller such that an external shape of the buffering member is reduced, by fastening the adjusting bolt.

6. The braking apparatus according to claim 1, wherein:
the deforming device comprises:
a holder that holds the buffering member;
an adjusting bracket that has a portion that is placed in contact with the outer circumferential surface of the buffering member; and
an adjusting bolt that passes through the adjusting bracket and is screwed into the holder; and
the adjusting bracket is displaced toward the holder such that the outside diameter of the buffering member is reduced, by fastening the adjusting bolt.

7. The braking apparatus according to claim 1, wherein:
the buffering member is held by a buffering member holding portion that is constituted by either one of the fixed portion and the movable portion;
a portion of an outer circumferential surface of the buffering member protrudes from the buffering member holding portion in a direction that is perpendicular to the direction of displacement of the movable portion;
the deforming device comprises:
an adjusting bracket that is placed in contact with the portion of the outer circumferential surface of the buffering member that protrudes outward from the buffering member holding portion; and
an adjusting bolt that passes through the adjusting bracket and is screwed into the buffering member holding portion; and
the adjusting bracket is displaced toward the buffering member holding portion such that the outside diameter of the buffering member is reduced, by fastening the adjusting bolt.

8. An elevator hoisting machine comprising:
a rotating body that has a driving sheave around which is wound a suspending body that suspends a car and a counterweight;
a motor that rotates the rotating body; and
a braking apparatus that brakes rotation of the rotating body,
the braking apparatus comprising:
a fixed portion;
a movable portion that is displaceable toward and away from the fixed portion;
a friction member that is disposed on the movable portion, and that brakes rotation of the rotating body by being placed in contact with the rotating body;
a forcing device that forces the movable portion in a direction that places the friction member in contact with the rotating body;
a braking force releasing device that displaces the movable portion in a direction in which the friction member separates from the rotating body in opposition to the forcing device;
a buffering member that is disposed between the fixed portion and the movable portion, and that is made of a flexible material; and
a deforming device that deforms the buffering member by pressing the buffering member in a direction that is perpendicular to the direction of displacement of the movable portion, wherein
the buffering member is a hollow member, and
the deforming device is disposed inside the buffering member, and presses an inner circumferential surface of the buffering member so as to expand an inside diameter thereof.

9. A buffering reaction force adjusting method for a braking apparatus comprising:
a fixed portion;
a movable portion that is displaceable toward and away from the fixed portion;
a friction member that is disposed on the movable portion, and that brakes rotation of a rotating body by being placed in contact with the rotating body;
a forcing device that forces the movable portion in a direction that places the friction member in contact with the rotating body;
a braking force releasing device that displaces the movable portion in a direction in which the friction member separates from the rotating body in opposition to the forcing device; and
a hollow buffering member that is disposed between the fixed portion and the movable portion, and that is made of a flexible material,
wherein, by pressing an inner circumferential surface of the buffering member in a direction that is perpendicular to a direction of displacement of the movable portion by a deforming device is disposed inside the buffering member to deform the buffering member so as to expand an inside diameter thereof and change a dimension of the buffering member in the direction of displacement of the movable portion, the buffering reaction force adjusting method for the braking apparatus adjusts reaction force characteristics of the buffering member during collisions with the movable portion or the fixed portion.

* * * * *